United States Patent [19]

Seamans

[11] 4,212,920

[45] Jul. 15, 1980

[54] FIREPROOFING COMPOSITION COMPRISING SODIUM SILICATE, GUM ARABIC OR OTHER GUM, AND A WATER DISPERSIBLE POLYMER SELECTED FROM THE CLASS OF EPOXY POLYMERS, NATURAL LATICES AND SYNTHETIC LATICES

[76] Inventor: Winthrop W. Seamans, 56 Hood St., Hayward, Calif. 94541

[21] Appl. No.: 922,834

[22] Filed: Jul. 10, 1978

[51] Int. Cl.$^2$ ............................ B32B 27/38; C08L 5/04
[52] U.S. Cl. ........................................ 428/413; 260/9; 260/17.4 ST; 264/109; 428/453; 428/498; 428/537; 428/921
[58] Field of Search .......................... 260/17.4 ST, 9; 428/413, 498, 453, 921; 264/109

[56] References Cited

U.S. PATENT DOCUMENTS

| | | | |
|---|---|---|---|
| 3,663,290 | 5/1972 | Klinge | 428/920 |
| 4,066,463 | 1/1978 | Chollet | 428/921 |
| 4,110,513 | 8/1978 | Heitmann | 428/921 |

FOREIGN PATENT DOCUMENTS 874762  8/1961  United Kingdom ..................... 428/921

OTHER PUBLICATIONS

Chem. Abstrs., vol. 73: 121616w, Waterproof and Fireproof Coating Compositions, Kimura et al.
Chem. Absts., vol. 77: 16347h, Flame Retardant Coating for Electric Cables, Trappenberg et al.
Chem. Absts., vol. 84: 110602q, Heat-Resisting Materials, Yokoyama et al.

Primary Examiner—Edward M. Woodberry
Attorney, Agent, or Firm—Edward B. Gregg

[57] ABSTRACT

Fireproofing composition comprising sodium silicate, gum arabic (or other gum) and a water dispersible polymer.

15 Claims, No Drawings

FIREPROOFING COMPOSITION COMPRISING SODIUM SILICATE, GUM ARABIC OR OTHER GUM, AND A WATER DISPERSIBLE POLYMER SELECTED FROM THE CLASS OF EPOXY POLYMERS, NATURAL LATICES AND SYNTHETIC LATICES

This application relates to fireproofing and fire retardant composition and to products treated thereby.

As used herein the term "fireproofing" is not intended to mean that an otherwise combustible substance such as wood has been treated so that it cannot be burned but it signifies a substantial reduction in the flammability of such article or substance.

It is desirable to fireproof wood used in construction of buildings by the surface application of a fireproofing agent which is not harmful to the surface to which it is applied, which does not detract unduly from its appearance and which is receptive to paint, varnish, etc. It is also desirable to provide a fireproofing agent which is not subject to, or has considerable resistance to deterioration on exposure to moisture. Further, it is desirable that a fireproofing agent be effective when applied by a brush, by spraying or by a roller and does not require any application of heat and pressure to impregnate the wood.

It is an object of the present invention to provide fireproofing compositions having one or more of the qualities mentioned above.

It is a further object of the invention to provide a fireproofing agent or composition which is effective upon simple surface application without application of heat and/or pressure.

The above and other objects of the invention will be apparent from the ensuing description and the appended claims.

I have found that a blend or mixture of a vegetable gum, such as gum arabic, sodium silicate and a water dispersible polymer such as an epoxy resin or a natural or synthetic latex provides a superior fireproofing agent and may be applied to a wood surface by brush, spray, roller or dipping without the need to apply heat and/or pressure and when so applied, it will improve considerably the fire resistance of the wood and will retain its fire retardant properties. If the composition is to be used for exterior use the proportion of polymer, e.g. epoxy resin or latex, is greater than if it is intended for interior use where it is not exposed to moisture. This composition is compatible with pigments where a particular color is desired.

The following specific examples will serve further to illustrate the practice and advantages of the invention.

Example 1—Base Composition

The ingredients were gum arabic, sodium silicate and an epoxy material.

The gum arabic was a 14° Be (5% by weight) aqueous solution.

The sodium silicate was $Na_2O.3SiO_2$ in the form of a 40% (by weight) aqueous solution.

The epoxy material was a product of The Synkoloid Co. of Compton, California known as CEM-BON in the form of an aqueous emulsion having 40% by weight of solids. The epoxy is believed to be a homopolymer of dimethacrylic acid ether of bisphenol A.

In the following procedure parts are by volume:

One part of gum arabic and two parts of sodium silicate were mixed. To the mixture were added six parts of sodium silicate which were added slowly with mixing. One part of epoxy was added and mixed. Then nine parts of sodium silicate were added followed by one part of gum arabic, the sodium silicate and gum arabic being added slowly with mixing.

The product had a viscosity of 800 cps at 25° C. It provides either a base coat to which a finish coat is added, or a finish coat for interior use where the coated surface is not exposed to moisture. Also it may serve as a base composition for the preparation of the composition of Example 2. Pigment may be added if desired. Alternatively, an oil base paint or varnish may be applied to the surface after coating with base coat. The surface coated with the base coat of this example has good fire retardant characteristics and will serve as the only coat for interior use where a finish coat is unnecessary. However, for exterior purposes, a water resistant finish coat should be used. Even where the use is interior the duration of fire retardance by the base coat is greatly enhanced by the use of a water resistant finish coat. In other cases (interior use and exterior use), it is preferred to use, as the finish coat, a composition prepared from the base coat composition of the present invention such as that of Example 2.

Example 2—Exterior Composition

Nineteen parts by volume of the epoxy material of Example 1 are mixed with one part by volume of the base composition of Example 1. This product can be applied to exterior wood surfaces and will withstand exposure to moisture as well as fireproofing the wood. As noted above, it is also advantageously used as a finish coat on a wood surface coated with the base coat of Example 1.

In place of the gum arabic of Examples 1 and 2, other gums or gum-like materials may be used such as guar gum, hydroxy alkyl guar, carboxy methyl guar, carboxymethylcellulose, polyacrylamide, and polyvinyl alcohol.

Mixtures of two or more such gums may be used. Sodium alginate may also be used. In the formulation of Example 1, ¼part by volume of sodium alginate dissolved in 4 parts water is preferred as the substitute for gum arabic and this solution is used in the same proportions as the gum arabic.

In place of the epoxy material in Example 1, other water-insoluble, water-dispersible natural and synthetic polymeric materials may be used such as natural rubber latex, synthetic rubber latexes, etc. Representative examples of such substitutes for the epoxy material, besides those mentioned above, are Acronal 300D of Rohm & Haas (a terpolymer of equal molar proportions of vinyl acetate, butyl acrylate and vinyl chloride; Acronal 500D (a polymer of 49 mol percent butyl acrylate, 49% vinyl acetate and 2% acrylic acid); a vinyl acetate-methylmethacrylate copolymer (15 mol percent acetate- 85% mol percent acrylate or a 50—50 copolymer); a vinyl acetate-butyl acrylate-acrylonitrile terpolymer; a vinyl acetate-butyl acrylate (75:25 mol percent) copolymer; a product known at Rhoplex AC-34 (a copolymer of ethyl acrylate and a suitable alkyl methacrylate); and terpolymers of an acrylate or methacrylate, vinyl acetate and styrene, butadiene or chloroprene. Suitable acrylic monomers for copolymerization with other monomers to form latices are the following: Methyl, ethyl, butyl, and 2-ethyl hexyl acrylates;

methyl, ethyl, butyl and isobutyl methacrylates; dimenthylamino ethyl methacrylate; tert. butylaminoethyl methacrylate; 2-hydroxyethyl methacrylate; hydroxypropyl methacrylate; methacrylic acid; acrylic acid.

The ingredients (gum or sodium alginate, sodium silicate and epoxy material, or latex) may be used in the following proportions (percentages by weight of dry material, solids or active ingredient):

|      |               | Broad Range | Preferred Range |
|------|---------------|-------------|-----------------|
| (1a) | Gum           | 5 to 15     | 8 to 12         |
| (1b) | Na alginate   | 5 to 15     | 8 to 12         |
| (2)  | Na silicate   | 50 to 90    | 75 to 90        |
| (3a) | Epoxy material| 3 to 20     | 3 to 7          |
| (3b) | Latex         | 3 to 20     | 3 to 7          |

On a solid basis the compositions of Examples 1 and 2 are as follows (parts by weight):

|       | Gum Arabic | Sodium Silicate | Epoxy |
|-------|------------|-----------------|-------|
| Ex.1  | 0.10       | 10.20           | 0.4   |
| Ex. 2 | 0.09       | 0.95            | 7.64  |

Variations within the limits set forth in the table above may be made.

Such compositions, when applied to wood surfaces, have a very great fire retardant effect.

The epoxy or other water-insoluble, water-dispersible polymeric material included in the base coat is employed in quantity sufficient to impart reasonable water resistance. Without it the sodium silicate-gum preparation has very poor durability even for interior use and it bonds poorly to a finish coat.

I have also found that it is advantageous to subject the composition to Example 2 to a boiling step to remove pigment, which step also improves fire resistance. By "boiling" is meant heating in a double boiler apparatus in which the immediate source of heat is boiling water. If the epoxy or other substitute material is available without pigment, this step may be omitted. In any event, boiling is optional but is preferred when pigment is present.

I have further found that the base composition of my invention is useful for producing consolidated cellulosic (or lignocellulosic) products such as pressboard. For example, used newsprint or other waste paper may be saturated with the composition of Example 1 or with any other base composition made in accordance with my invention, or paper may be shredded and saturated with such a composition, and the saturated paper may than be placed in a press and subjected to pressure. The resulting board is allowed to dry (air drying or oven drying). The board is hard; it is a substitute for whole wood, plywood, particle board and for other reconstituted cellulosic and lignocellulosic boards; it can be planned, nailed and sawed much like whole wood; and it is fire resistant. Other cellulosic and lignocellulosic materials amenable to this method are sawdust, wood shavings, wood chips, the product of subjecting wood chips to steam under pressure and then releasing pressure to explode the chips, wood pulp such as used in the manufacture of paper including sulfite, sulfate, kraft and ground wood pulp and, in general, all manner and kinds of cellulosic and lignocellulosic material which lends itself to saturation with an aqueous medium, molding and pressing. The pressing I have done has been in a hand vise and at room temperature. The surface of such board is receptive to paint such as that of Example 2 or any other paint or surface coating composition which is applicable to wood.

It will therefore be apparent that new and useful compositions have been provided which fireproof wood.

I claim:

1. A fire retardant composition useful for surface coating to impart fire resistance to a wood substrate to which the composition is applied, said composition comprising (a) an aqueous solution of alkali metal silicate, (b) a substance selected from the class of natural gums, synthetic gums and water soluble alginates and (c) a water-insoluble, water-dispersible polymer selected from the class of epoxy polymers, natural latices and synthetic latices, said silicate substantially exceeding the amount of components (b) and (c), the combined proportions of (a) and (b) being sufficient to impart fire retardant characteristics to the composition; the amount of (c) being sufficient to impart moisture resistance to wood coated by the composition.

2. The composition of claim 1 wherein the silicate is $Na_2O.3SiO_3$ and the substance (b) is a natural gum.

3. The composition of claim 2 wherein the gum is gum arabic.

4. The composition of claim 3 wherein the polymer (c) is selected from the class of epoxy polymers, natural latices and synthetic latices.

5. The composition of claim 4 wherein the ingredients are present in the following proportions by weight:
Silicate: 100
Gum arabic: 1
Epoxy or latex: 4.

6. The composition of claim 2 in admixture with a further quantity polymer (c) whereby the polymer (c) predominates and the composition is sufficiently moisture resistant for exterior use.

7. Wood coated with the composition of claim 1.
8. Wood coated with the composition of claim 2.
9. Wood coated with the composition of claim 3.
10. Wood coated with the composition of claim 4.
11. Wood coated with the composition of claim 5.

12. A method of producing a moisture resistant, consolidated cellulosic or lignocellulosic product comprising providing a substrate of loose cellulosic or lignocellulosic material, saturating such substrate with the composition of claim 2, molding the saturated mass to a shaped mass, applying pressure to consolidate the molded mass and drying the resulting compressed, shaped mass.

13. The method of claim 12 wherein the substrate is waste paper.

14. A board-like product made by the method of claim 12.

15. A board-like product made by the method of claim 13.

* * * * *